United States Patent
Goldberg et al.

(10) Patent No.: US 12,480,765 B2
(45) Date of Patent: Nov. 25, 2025

(54) EXTERNAL VENTRICULAR AND LUMBAR DRAINAGE ALARM APPARATUS AND METHODS OF USE THEREOF

(71) Applicants: Jacob L. Goldberg, New York, NY (US); Joseph A. Carnevale, New York, NY (US)

(72) Inventors: Jacob L. Goldberg, New York, NY (US); Joseph A. Carnevale, New York, NY (US)

( * ) Notice: Subject to any disclaimer, the term of this patent is extended or adjusted under 35 U.S.C. 154(b) by 614 days.

(21) Appl. No.: 17/958,655

(22) Filed: Oct. 3, 2022

(65) Prior Publication Data

US 2023/0107612 A1 Apr. 6, 2023

Related U.S. Application Data

(60) Provisional application No. 63/251,671, filed on Oct. 3, 2021.

(51) Int. Cl.
*G01C 15/00* (2006.01)
(52) U.S. Cl.
CPC .................................. *G01C 15/004* (2013.01)

(58) Field of Classification Search
None
See application file for complete search history.

(56) References Cited

U.S. PATENT DOCUMENTS

| 5,073,720 A | * | 12/1991 | Brown | G01F 23/292 |
|---|---|---|---|---|
| | | | | 250/577 |
| 2016/0030673 A1 | * | 2/2016 | White | G16H 10/60 |
| | | | | 702/50 |
| 2017/0016743 A1 | * | 1/2017 | Dumoulin | G01C 25/00 |

* cited by examiner

*Primary Examiner* — Suman K Nath
(74) *Attorney, Agent, or Firm* — GrowIP Law Group LLC (57) ABSTRACT

The disclosure provides example apparatus and methods for monitoring EVD and LD drainage systems and generating alerts. The example apparatus includes (a) a U-shaped housing having a first end and a second end, where the first end and the second end of the U-shaped housing are configured to be arranged on opposing sides of a vessel, (b) a photodiode coupled to the first end of the U-shaped housing, (c) a laser diode coupled to the second end of the U-shaped housing, where the laser diode and the photodiode are arranged in the housing facing each other such that a contact layer of the photodiode is configured to receive a laser beam emitted from the laser diode, and (d) an alert processor electrically coupled to the photodiode and to at least one alert generator.

20 Claims, 7 Drawing Sheets

EXTERNAL VENTRICULAR AND LUMBAR DRAINAGE ALARM APPARATUS AND METHODS OF USE THEREOF

CROSS-REFERENCE TO RELATED APPLICATION

This application is a U.S. Non-Provisional application that claims the benefit of the filing date of U.S. Provisional Application No. 63/251,671, filed Oct. 3, 2021, which is hereby incorporated by reference in its entirety.

BACKGROUND

External ventricular drains ("EVDs") are placed into the ventricles of the brain to drain cerebrospinal fluid ("CSF") and relieve intracranial pressure. When increased intracranial pressure results from obstructed flow of CSF, EVDs can be lifesaving. In this setting, external ventricular drainage can allow maintenance of physiologic intracranial pressure. However, if excess CSF is removed, life-threatening intracranial hematomas can arise leading to permanent neurologic deficit, coma, or death. Since CSF drainage is gravity and pressure dependent, the "rate of drainage" cannot be set. Rather, each patient drains at an individual rate. This rate is not fixed and is constantly changing. To prevent over-drainage, these patients are monitored in the ICU by nurses that are often over worked and understaffed; a process that is subject to human error. Monitoring of drainage occurs solely by nurse visual inspection. Unfortunately, over-drainages do occur.

Similarly, lumbar drains ("LD") are placed into the thecal sac at the lumbar spine for a variety of clinical indications. The LD and the EVD are the exact same drain with the only difference being the site of their termination in the body (i.e., lumbar vs cranial). These drains are also dependent on visual nursing inspection to prevent over drainage. Over-drainage can and does occur from lumbar drains. Similar to EVDs, LDs do over-drain and can result in severe neurologic disability or death.

Both EVDs and LDs can be lifesaving tools. Unfortunately, their reliance on visual inspection to detect over-drainage leave them prone to human error.

SUMMARY

In a first aspect, an example apparatus for monitoring EVD and LD drainage systems and generating alerts is disclosed. The microfluidic device includes (a) a U-shaped housing having a first end and a second end, where the first end and the second end of the U-shaped housing are configured to be arranged on opposing sides of a vessel, (b) a photodiode coupled to the first end of the U-shaped housing, (c) a laser diode coupled to the second end of the U-shaped housing, where the laser diode and the photodiode are arranged in the housing facing each other such that a contact layer of the photodiode is configured to receive a laser beam emitted from the laser diode, and (d) an alert processor electrically coupled to the photodiode and to at least one alert generator.

In a second aspect, an example method for using the apparatus according to the first aspect is disclosed. The method of the second aspect includes (a) arranging the first end and the second end of the U-shaped housing on opposing sides of a vessel at a target fluid level, (b) activating the photodiode and the laser diode such that the laser diode directs a laser beam to the contact layer of the photodiode, (c) continuously receiving, via the alert processor, a current output from the photodiode, (d) receiving a fluid in the vessel and thereby causing a fluid level in the vessel to rise, (e) disrupting a path of the laser beam, via the fluid, when the fluid level rises to the target fluid level, and thereby causing current output of the photodiode to drop, (f) determining, via the alert processor, that the current output has dropped to a predetermined threshold, and (g) in response to determining that the current output has dropped to the predetermined threshold, sending a signal, via the alert processor, to the at least one alert generator and thereby causing at least one alert to be generated.

The features, functions, and advantages that have been discussed can be achieved independently in various examples or may be combined in yet other examples further details of which can be seen with reference to the following description and drawings.

BRIEF DESCRIPTION OF THE DRAWINGS

The drawings are for the purpose of illustrating examples, but it is understood that the inventions are not limited to the arrangements and instrumentalities shown in the drawings.

The drawings are for the purpose of illustrating examples, but it is understood that the inventions are not limited to the arrangements and instrumentalities shown in the drawings.

DETAILED DESCRIPTION

I. Overview

Exemplary drainage alarm apparatus and methods are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed drainage alarm apparatus and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

The disclosed examples provide an apparatus and methods of use to continuously monitor the fluid level in external ventricular drains ("EVD") and lumbar drains "(LD") and to issue alerts. The disclosed apparatus and methods advantageously supplement monitoring of EVDs and LDs to decrease human error and improve patient outcomes. In operation, the apparatus may be adjustable and configured to detect a fluid column within a vessel of an EVD or LD.

Stakeholders include patients requiring EVDs, patients requiring LDs, nurses who currently monitor the EVDs by visual inspection and frequent checks, nurses who currently monitor LDs by visual inspection and frequent checks, surgeons who place EVDs, surgeons or proceduralists who place LDs, anesthesiologists who monitor the EVD's/LD's when a patient with an EVD or LD goes to surgery, hospital systems that face massive liability in the face of a life/limb threatening over drainage caused 100% of the time by human error.

There are multiple benefits and advantages from the example implementations of the present disclosure. For example, the apparatus is easy to install or affix to EVD or LD and there is ease of functionality. The apparatus is adjustable to allow different amounts of drainage before an alarm sounds and may detect fluid of different levels of opacity and colors. The apparatus may produce a reliable and identifiable alarm, when a fluid column reaches a predetermined alarm height at a target location of the vessel of the EVD of LD. Still further, the apparatus is sensitive and specific to over-drainage of fluid. In addition, the apparatus is compatible with different EVD/LD manufacturers.

II. Example Architecture

Figure 1:
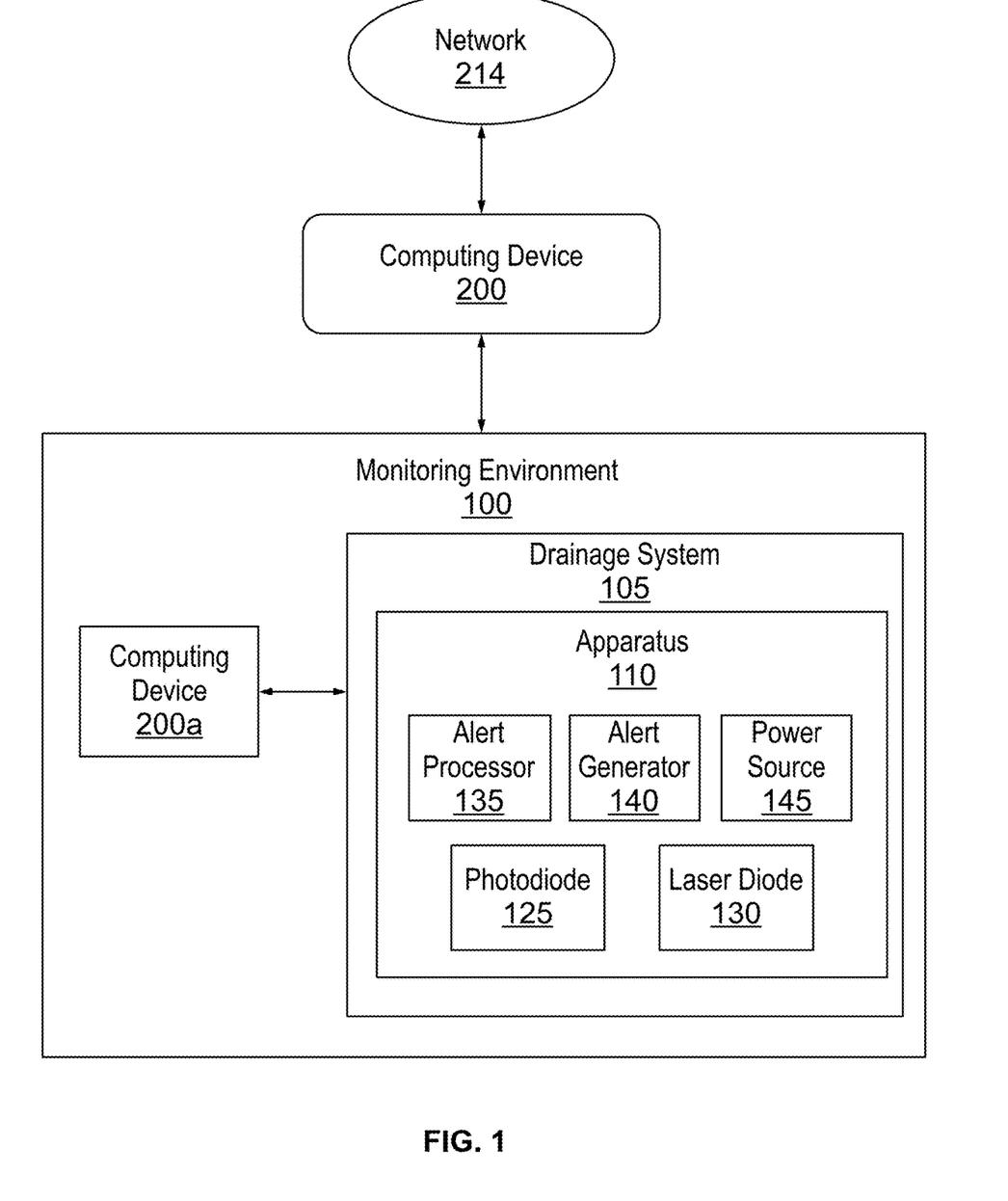
FIG. 1 is a functional block diagram of a system using the apparatus, according to one example implementation.

FIG. 1 is a block diagram showing a monitoring environment 100 that includes or involves, for example, a drainage system 105 (e.g., an EVD or LD) that includes an apparatus 110 shown in detail in FIGS. 3-11 and described below. Method 300 in FIG. 12 described below show embodiments of methods that can be implemented within this monitoring environment 100.

Figure 2:
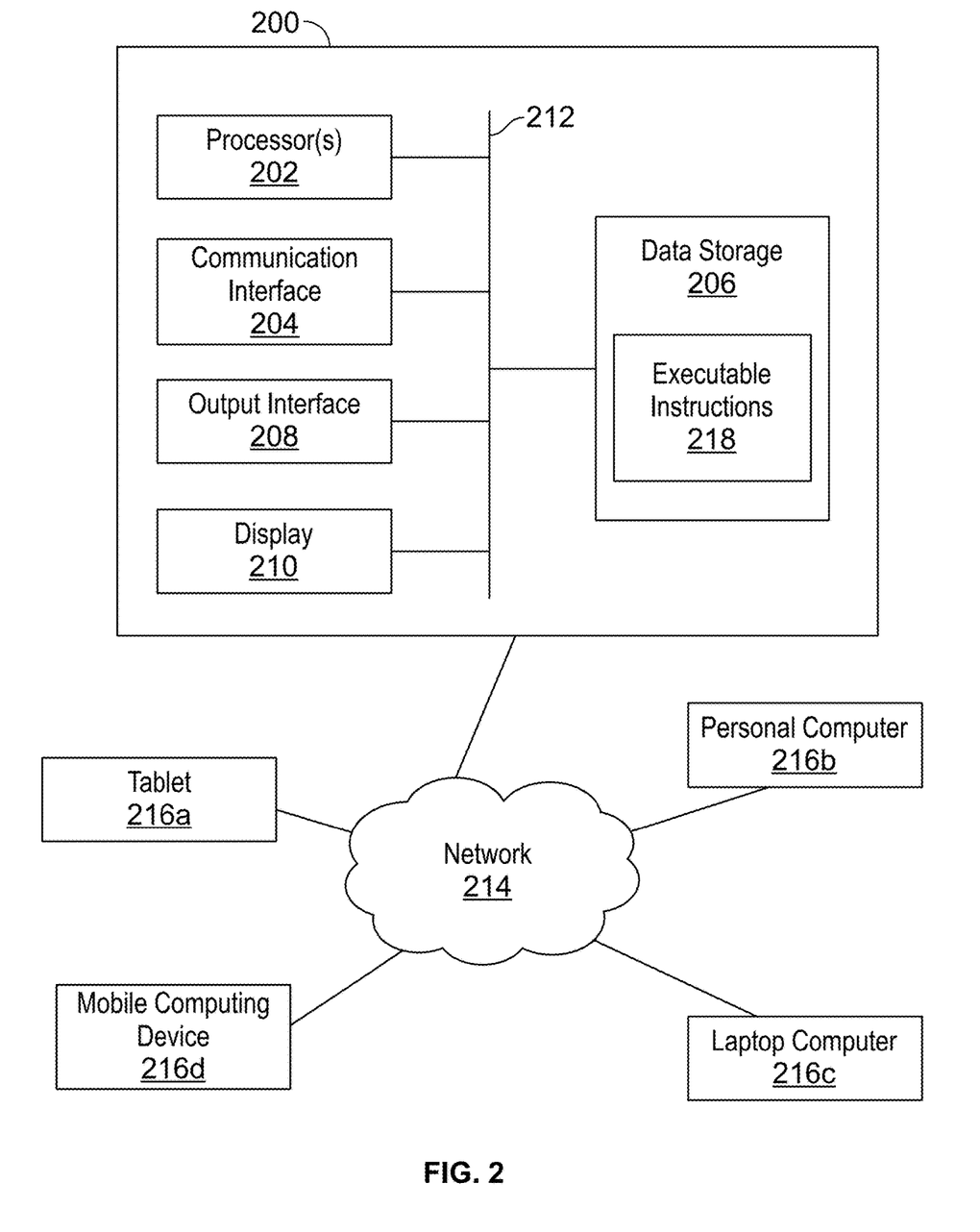
FIG. 2 depicts a block diagram of a computing device and a computer network, according to an example implementation.

FIG. 2 is a block diagram illustrating an example of a computing device 200, according to an example implementation, that is configured to interface with operating environment 100, either directly or indirectly. The computing device 200 may be used to perform functions of the method shown in FIG. 12 and described below. In particular, computing device 200 can be configured to perform one or more functions, including determining that the current output has dropped to a predetermined threshold and sending a signal to the at least one alert generator and thereby causing at least one alert to be generated, for example. The computing device 200 has a processor(s) 202, and also a communication interface 204, data storage 206, an output interface 208, and a display 210 each connected to a communication bus 212. The computing device 200 may also include hardware to enable communication within the computing device 200 and between the computing device 200 and other devices (e.g., not shown). The hardware may include transmitters, receivers, and antennas, for example.

The communication interface 204 may be a wireless interface and/or one or more wired interfaces that allow for both short-range communication and long-range communication to one or more networks 214 or to one or more remote computing devices 216 (e.g., a tablet 216a, a personal computer 216b, a laptop computer 216c and a mobile computing device 216d, for example). Such wireless interfaces may provide for communication under one or more wireless communication protocols, such as Bluetooth, Wi-Fi (e.g., an institute of electrical and electronic engineers (IEEE) 802.11 protocol), Long-Term Evolution (LTE), cellular communications, near-field communication (NFC), and/or other wireless communication protocols. Such wired interfaces may include Ethernet interface, a Universal Serial Bus (USB) interface, or similar interface to communicate via a wire, a twisted pair of wires, a coaxial cable, an optical link, a fiber-optic link, or other physical connection to a wired network. Thus, the communication interface 204 may be configured to receive input data from one or more devices and may also be configured to send output data to other devices.

The communication interface 204 may also include a user-input device, such as a keyboard, a keypad, a touch screen, a touch pad, a computer mouse, a track ball and/or other similar devices, for example.

The data storage 206 may include or take the form of one or more computer-readable storage media that can be read or accessed by the processor(s) 202. The computer-readable storage media can include volatile and/or non-volatile storage components, such as optical, magnetic, organic or other memory or disc storage, which can be integrated in whole or in part with the processor(s) 202. The data storage 206 is considered non-transitory computer readable media. In some examples, the data storage 206 can be implemented using a single physical device (e.g., one optical, magnetic, organic or other memory or disc storage unit), while in other examples, the data storage 206 can be implemented using two or more physical devices.

The data storage 206 thus is a non-transitory computer readable storage medium, and executable instructions 218 are stored thereon. The instructions 218 include computer executable code. When the instructions 218 are executed by the processor(s) 202, the processor(s) 202 are caused to perform functions.

The processor(s) 202 may be a general-purpose processor or a special purpose processor (e.g., digital signal processors, application specific integrated circuits, etc.). The processor(s) 202 may receive inputs from the communication interface 204 and process the inputs to generate outputs that are stored in the data storage 206 and output to the display 210. The processor(s) 202 can be configured to execute the executable instructions 218 (e.g., computer-readable program instructions) that are stored in the data storage 206 and are executable to provide the functionality of the computing device 200 described herein.

The output interface 208 outputs information to the display 210 or to other components as well. Thus, the output interface 208 may be similar to the communication interface 204 and can be a wireless interface (e.g., transmitter) or a wired interface as well. The output interface 208 may send commands to one or more controllable devices, for example.

The computing device 200 shown in FIG. 2 may also be representative of a local computing device 200a in monitoring environment 100, for example, in communication with the apparatus 105. This local computing device 200a may perform one or more of the steps of the method 300 described below.

Figure 12:
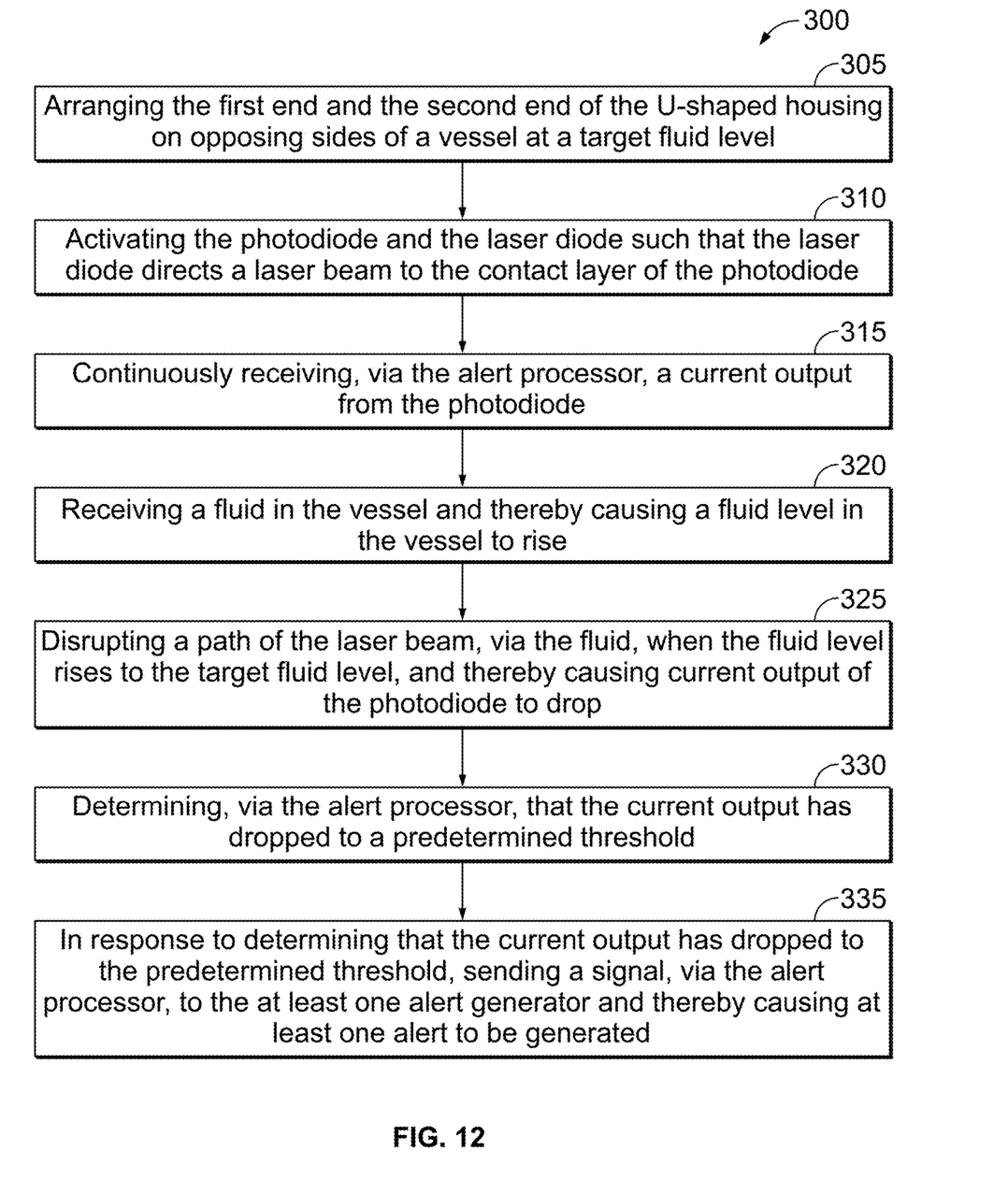
FIG. 12 is a flow diagram of a method for use of the apparatus with a drainage system, according to one example implementation.

FIG. 12 shows a flowchart of example method 300 to a fluid level in an EVD or LD drainage systems 105, according to an example implementation. Method 300 is an example method that could be used with the computing device 200 of FIG. 2, for example. In some instances, components of the devices and/or systems may be configured to perform the functions such that the components are configured and structured with hardware and/or software to enable such performance. Components of the devices and/or systems may be arranged to be adapted to, capable of, or suited for performing the functions, such as when operated in a specific manner. Method 300 may include one or more operations, functions, or actions as illustrated by one or more of blocks 305-335, respectively. Although the blocks are illustrated in a sequential order, some of these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of the present examples. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time such as register memory, processor cache, and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 12, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

III. Example Apparatus

The example apparatus and methods disclosed herein are used to monitor drainage systems (e.g., external ventricular drains ("EVDs") and lumbar drains ("LDs")) and to generate alerts. These EVD and LD drainage systems 105 include a vessel 120 in fluid communication with a patient and configured to receive draining fluid (e.g., cerebrospinal fluid ("CSF")). In one implementation, the vessel 120 may be a burette or drip chamber for collection of CSF. The vessel 120 includes fluid-level indicators 121 (i.e., graduations) arranged longitudinally at regular intervals for accurate measurement of CSF. In operation, the vessel 120 is coupled to a vertical support 122.

In a first aspect, shown in FIGS. 3-11, an apparatus 110 includes a U-shaped housing 115 having a first end 116 and a second end 117. The first end 116 and the second end 117 of the U-shaped housing 115 are configured to be arranged on opposing sides of a vessel 120. A photodiode 125 is coupled to the first end 116 of the U-shaped housing 115, and a laser diode 130 is coupled to the second end 117 of the U-shaped housing 115. The U-shaped housing 115 may include a through-channel 119 to accommodate a wired coupling between the photodiode 125 and the laser diode 130. The laser diode 130 and the photodiode 125 are arranged in the U-shaped housing 115 facing each other such that a contact layer 126 of the photodiode 125 is configured to receive a laser beam emitted from the laser diode 130. In one optional implementation, the photodiode 125 and the laser diode 130 are arranged in a first plane in the U-shaped housing 115 such that the first plane is configured to be parallel to fluid-level indicators 121 on the vessel 120.

Figure 3:
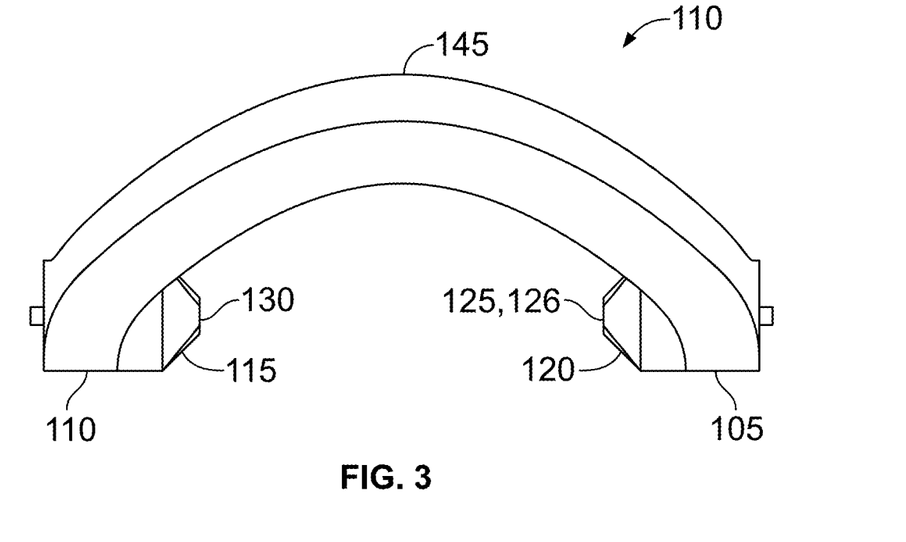
FIG. 3 is a front view of the U-shaped housing of the apparatus, according to an example implementation.
Figure 4:
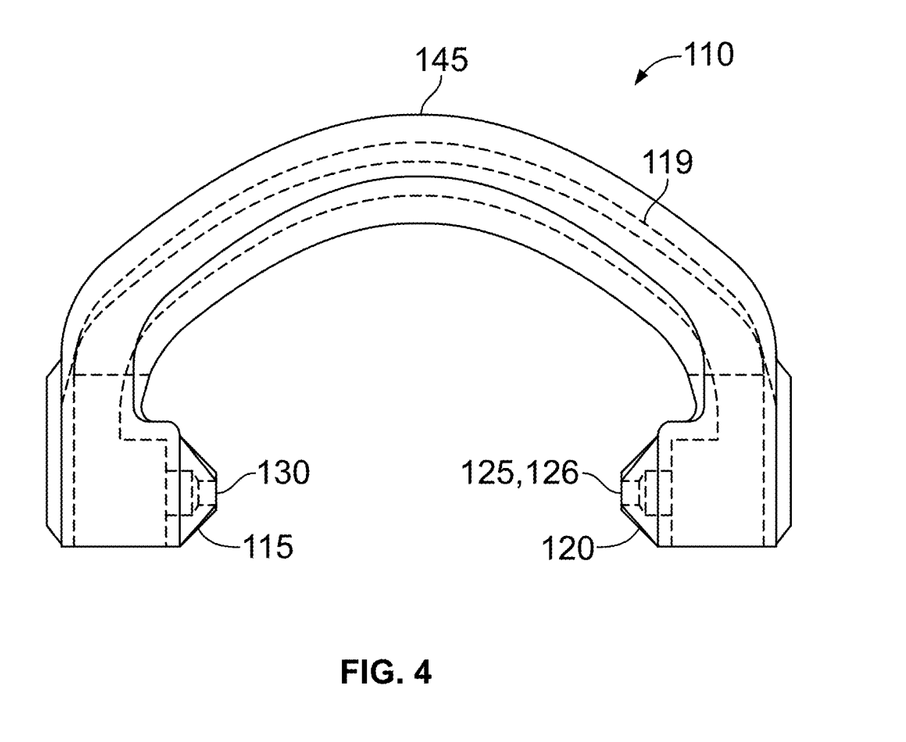
FIG. 4 is a bottom view of the U-shaped housing of the apparatus, according to the example of FIG. 3.
Figure 5:
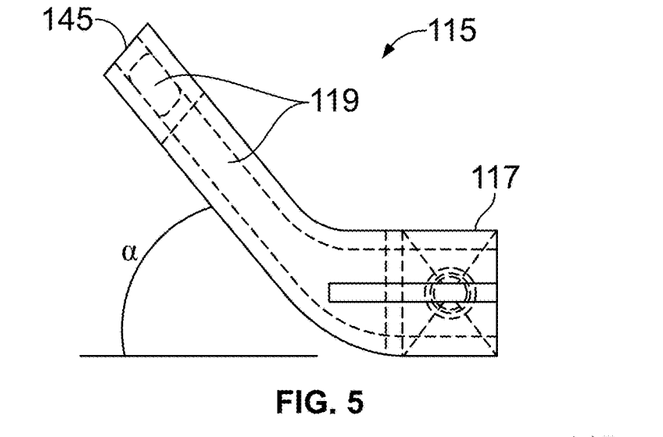
FIG. 5 is a side view of the U-shaped housing of the apparatus, according to the example of FIG. 3.
Figure 6:
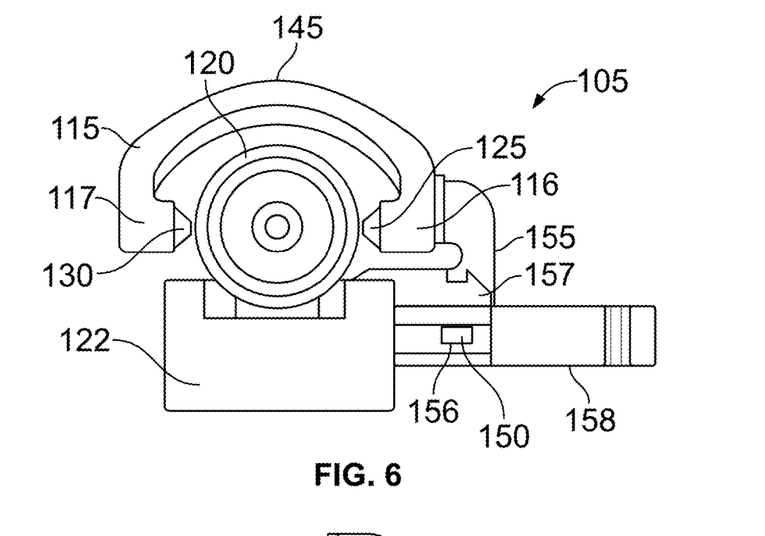
FIG. 6 is a top view of the drainage system and the apparatus, according to an example implementation.
Figure 7:
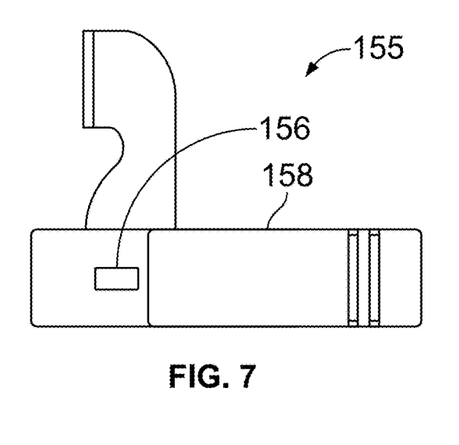
FIG. 7 is a top view of the carrier of the apparatus, according to a first example implementation.

In one optional implementation, a mid-portion 118 of the U-shaped housing 115 extending between the photodiode 125 and the laser diode 130 is arranged at a displacement angle α relative to the first plane. The displacement angle α of the mid-portion 118 of the U-shaped housing 115 ranges from 30 to 60 degrees upward or downward relative to the first plane to provide visibility of the fluid-level indicators 121 on the vessel 120 at a target location between the photodiode 125 and the laser diode 130.

The apparatus 110 also includes an alert processor 135 electrically coupled to the photodiode 125 and to at least one alert generator 140. As used herein, "electrically coupled" refers to coupling using a conductor, such as a wire or a conductible trace, as well as inductive, magnetic and wireless couplings. The alert processor 130 may be part of the photodiode circuit and Arduino described below with respect to FIG. 11. Alternatively, the alert processor 130 may be correspond to a processor 202 that is part of a computing device 200a described above.

In one optional implementation, the photodiode 125 is configured to output current in response to the laser beam of the laser diode 130. And the alert processor 135 is configured to cause at least one alert when the current output from the photodiode 125 is determined to drop to a predetermined threshold. In a further optional implementation, the predetermined threshold of the current output is 0 Amps. In operation, as CSF fluid drains into the vessel 120 and the fluid level rises to the target location, the fluid interrupts the path of the laser beam from the laser diode 130 to the photodiode 125. Once the photodiode 125 stops receiving or detecting the laser beam, the current generated by the photodiode 125 drops. This drop in current is then detected by the alert processor 135 to thereby cause an alert to be issued.

In one optional implementation, the at least one alert is in the form of visible or audible feedback. In a further implementation, the alert generator 140 is a light 140a, an electronic display, an alarm 140b, and a vibration controller. The alert generators 140 may be located local to the vessel 120 (e.g., coupled to the support 122 for the vessel 120) and/or on a remote computing device 216. Local alert generators 140 have the benefit of issuing an audible alarm 140b or illuminating visible lights (e.g., LEDs) 140a to alert individuals in the room or in the vicinity of the apparatus 110. Remote alert generators may advantageously alert an individual actively attending to a patient in another room or out of earshot of an audible local alarm, for example, through an electronic display (e.g., a text message or flashing display screen), haptic feedback via a vibration controller, or an audible alarm that are all standard on mobile computing devices 216d.

Figure 9:
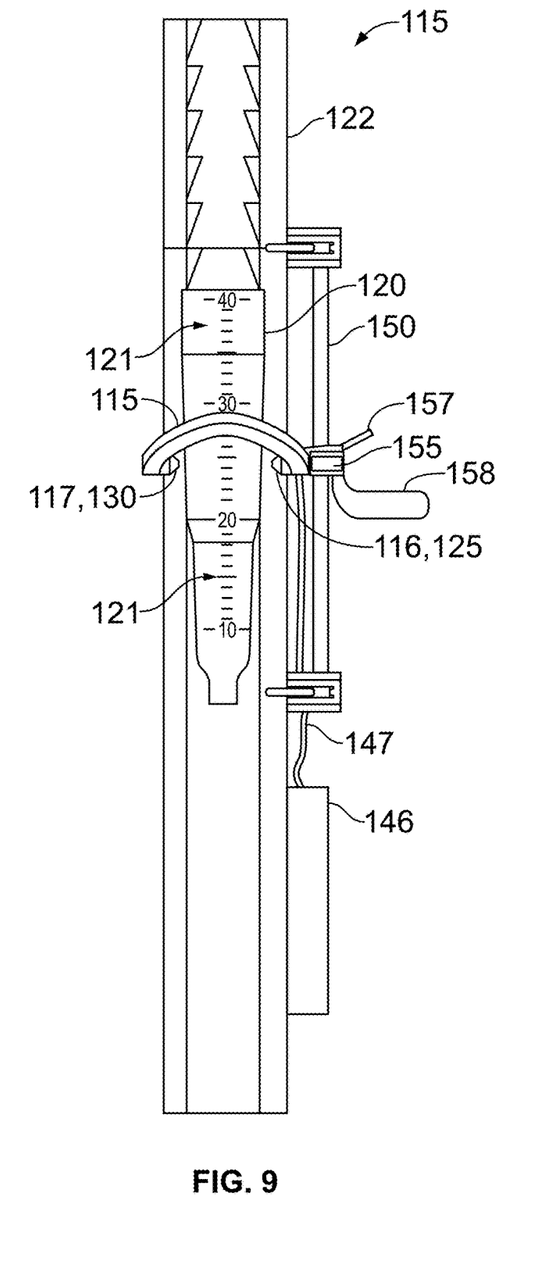
FIG. 9 is a front view of the drainage system and the apparatus, according to an example implementation.
Figure 10:
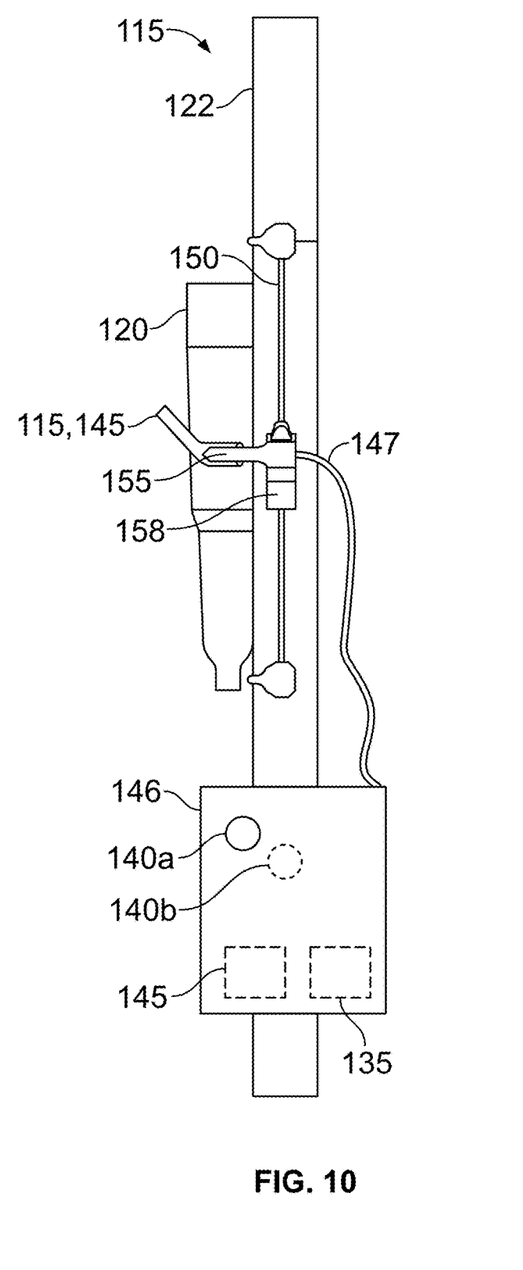
FIG. 10 is a side view of the drainage system and the apparatus, according to the example of FIG. 9.

In a further optional implementation, the apparatus 110 includes a power source 145 coupled to the photodiode 125, the laser diode 130, and the alert processor 135. As shown in FIGS. 9-10, the power source 145 may be contained in a housing 146 coupled to the support 122 for the vessel 120. The housing 146 may also include the light 140a, the alarm 140b, and/or an electronic display, and the alert processor 135, as well as other components. The foregoing components may be coupled to each other, the photodiode 125, and the laser diode 130 via a wired coupling 147, for example.

In another optional implementation, shown in FIGS. 6-7 and 9-10, the apparatus 110 includes a rail 150 configured to be coupled to a support 122 for the vessel 120 such that the rail 150 is arranged adjacent to and parallel to a length of the vessel 120. The apparatus 110 also includes a carrier 155 having a through-hole 156 to receive the rail 150 therethrough. The carrier 155 is coupled to either the first end 116 or the second end 117 of the U-shaped housing 115. The carrier 155 is slidably coupled to the rail 150. The carrier 155 also has a clamp 157 configured to lock the U-shaped housing 115 in place when the U-shaped housing 115 is moved along the rail 150 to a target location relative to the vessel 120. In one optional implementation, the carrier 155 may include a finger grip 158 to facilitate movement along the rail 150.

Figure 8:
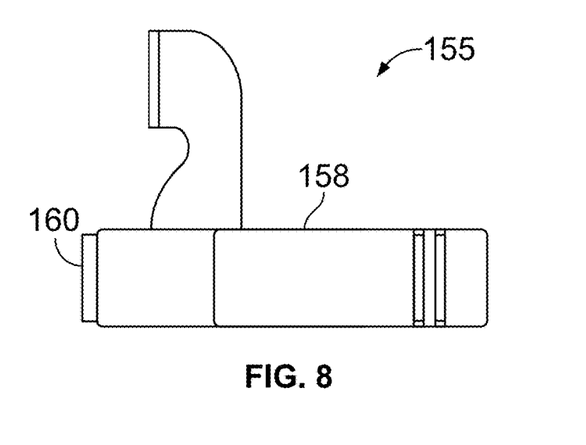
FIG. 8 is a top view of the carrier of the apparatus, according to a second example implementation.

In an alternative implementation, as shown in FIG. 8, the apparatus 110 includes a carrier 155 coupled to either the first end 116 or the second end 117 of the U-shaped housing 115. The carrier 155 has a coupling 160 in the form of an adhesive, reciprocal hook and loop, or a magnet that is configured to removably mount the carrier 155 to a support 122 for the vessel 120. In one optional implementation, the carrier 155 may include a finger grip 158 to facilitate placement on the support 122.

Figure 11:
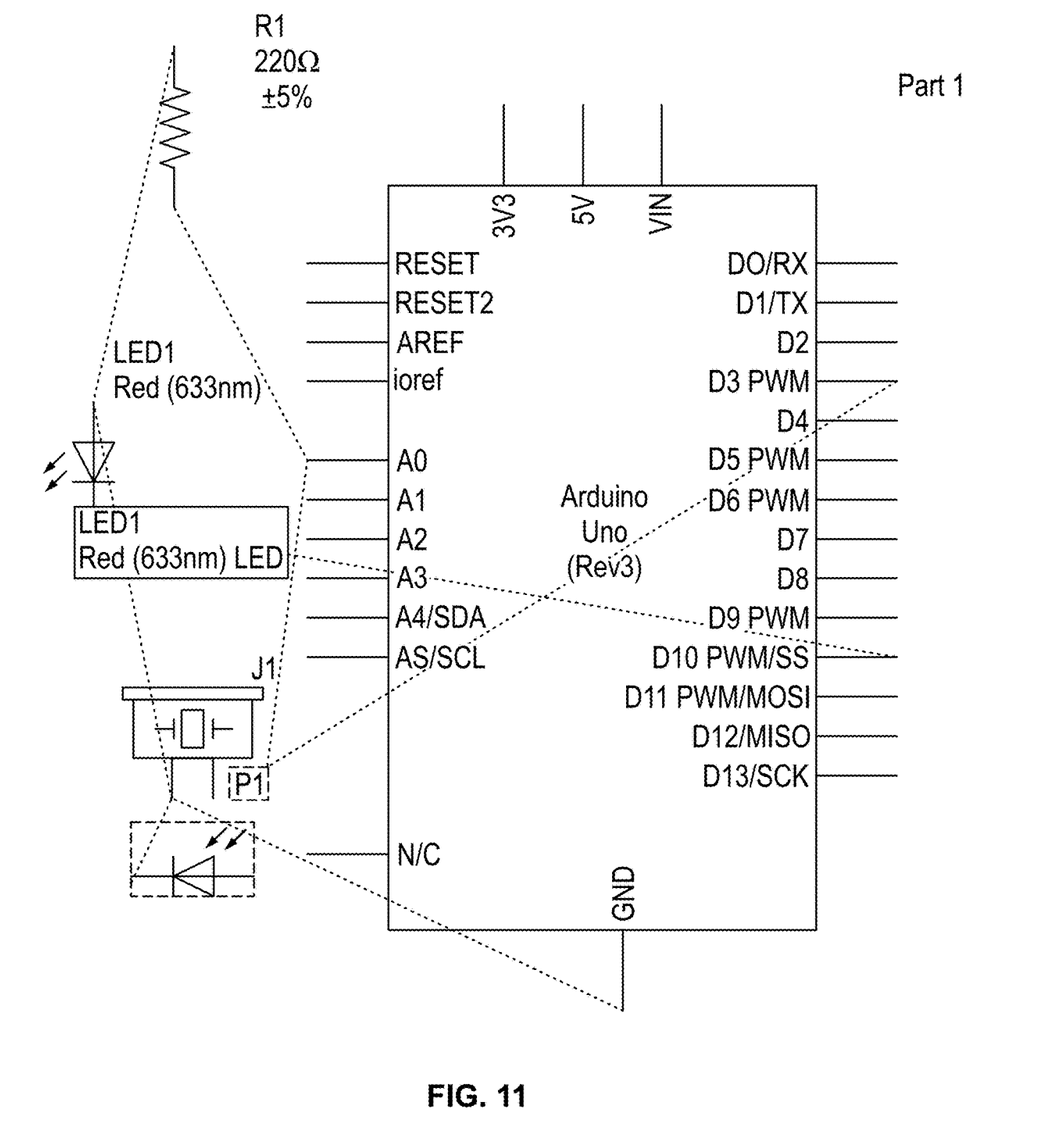
FIG. 11 is a schematic diagram illustrating a photodiode circuit with Arduino embodying a processor, according to one example implementation.

In one example implementation, as shown in FIG. 11, a schematic diagram is provided illustrating a photodiode readout circuit with Arduino embodying one example of the processor 202 shown in FIG. 2. In other words, the schematic of FIG. 11 represents circuitry that is wired to perform the specific logical functions in the process. For example, a feather board circuit is provided in FIG. 2 and described in the Arduino Code below. This circuit includes a 3.7 V LiPo battery, a 32u4 Adafruit feather board, and a JST jack of the feather board. A USB cable includes four wires, namely a first ground, a second ground, a photodiode 125, and a laser diode 130. An off/on sliding switch is connected to the ground and enable pins on the feather board to be activated. An LED 140a is connected to the ground and the analog pin 11 of the feather board. A an alarm buzzer 140b is connected to the ground and the analog pin 3 of the feather board. A 51Ω resistor is connected from the analog 0 pin to the photodiode and the ground. A 75Ω resistor is connected from 3.3 V pin of the feather board to the laser diode 130 and the ground.

Arduino Code

```
int val = 0;
int analogPin = A0;
```

-continued

```
int LED = 11;
unsigned long startTime;
unsigned long elapsedTime;
int buzzer = 3;    // potentiometer connected to analog pin 3
void setup( ) {
   Serial.begin( 1200);
   pinMode(LED,OUTPUT);
   pinMode(buzzer,OUTPUT);
}
void loop( ) {
   val = analogRead(analogPin);
   if (val<70) {
       elapsedTime = millis( ) – startTime;
       if (elapsedTime>2000){
           digitalWrite(LED, HIGH);
           analogWrite(buzzer, 1000);
       }
   }
   else {
       digitalWrite(LED, LOW);
       digitalWrite(buzzer, LOW);
       startTime = millis( );
   }
}
```

IV. Example Methods

The following method 300 may include one or more operations, functions, or actions as illustrated by one or more of blocks 305-335. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Referring now to FIG. 12, FIG. 12 shows a flowchart of an example method 300 for using the apparatus 110 with drainage system 105, according to an example implementation. Method 300 includes, at block 305, arranging the first end and the second end of the U-shaped housing on opposing sides of a vessel at a target fluid level. In optional implementations, the target fluid level corresponds to either a fluid level ranging from 18 mL to 20 mL to detect over-drainage or to a fluid level ranging from 30 mL to 40 mL to detect severe over-drainage. The target fluid level may be selected at alternative ranges based on patient-specific criteria. In one example, the U-shaped housing 115 may be moved along a rail 150 and clamped in place at the target fluid level or, alternatively, removably coupled to a support 122 for the vessel 120 at the target fluid level via a coupling 160 of the carrier 155 in the form of an adhesive, reciprocal hook and loop, or a magnet.

Then, at block 310, the photodiode 125 and the laser diode 130 are activated such that the laser diode 130 directs a laser beam to the contact layer 126 of the photodiode 125. Next, at block 315, the alert processor 135 continuously receives a current output from the photodiode 125. At block 320, a fluid is received in the vessel 120 and thereby causes a fluid level in the vessel 120 to rise. In various embodiments, the fluid may be opaque or translucent. Then, at block 325, a path of the laser beam is disrupted, via the fluid, when the fluid level rises to the target fluid level, and thereby causes the current output of the photodiode 125 to drop.

And, at block 330, the alert processor 135 determines that the current output has dropped to a predetermined threshold. In one optional implementation, the predetermined threshold of the current is 0 Amps. At block 335, in response to determining that the current output has dropped to the predetermined threshold, the alert processor 135 sends a signal to the at least one alert generator 140 and thereby causing at least one alert to be generated.

In one optional implementation, sending the signal, via the alert processor 135, to the at least one alert generator 140 includes sending a wireless signal to at least one remote computing device 216. This has the advantage of alerting an individual that may be out of earshot or visual contact with the drainage system 105.

In one optional implementation, method 300 includes generating the at least one alert in the form of visible or audible feedback. In one example, generating the at least one alert in the form of the visible or audible feedback includes activating a first alert generator 140 in the form of an LED 140a and second alert generator 140 in the form of an alarm 140b. This example would alert an individual in the vicinity of an alert generator 140 in proximity to the drainage system 105. In an alternative example, generating the at least one alert in the form of the visible or audible feedback includes activating the at least one alert generator 140 on at least one remote computing device 216 in the form an electronic display, an alarm, and a vibration controller, as discussed above with respect to the apparatus 110.

Example 1. Product Tests, Verification, and Validation

LED testing was conducted that generated an operating voltage of 1.1 V and an operating current of 0.05 A from an external power supply. A multimeter was used to check voltage to avoid burning the laser diode. The laser diode and photodiode connected the multimeter to an oscilloscope with the same operating current and voltage as referenced above. The test was conducted with a beaker. An empty beaker showed high current output via oscilloscope, whereas water added up to the level of the sensing point showed a subsequent drop in current to 0 Amps.

A light curtain concept was then tested on the EVD burette at different volumes with an operating current of 0.04 A, operating voltage of 1.1 V, and a pressure of 16 mm Hg (or about 22 cm $H_2O$). The volumes tested on the EVD burette were 40 mL, 30 mL, 22 mL, 20 mL, and 18 mL. Each of those conditions were met with success, demonstrated by the current dropping down to 0 A on the oscilloscope, when the water reached the sensing point. The diodes were able to detect the water level when held on a straight plane on both sides without being placed directly on the burette. The 30 mL to 40 mL range was then tested for severe over-drainage and the 18 mL to 20 mL range for an over-drainage warning.

The significance of testing at the 22 mL point is that the slanted part of the burette of the EVD (between the 20 mL to 25 mL range) has a non-uniform diameter. Due to the shape of that region, there was a negligible decrease in the voltage due to some light being refracted off the surface, however, the light curtain concept worked effectively.

Finally, the diodes provided good contrast to the point where the light did not need to be focused, so the unmounted aspheric lens (f=1.49 mm, NA=0.53, ARC: 1050-1700 nm) purchased from ThorLabs along with the diodes was no longer necessary for the proof-of-principle prototype. This is significant because it reduced the overall expense of the apparatus.

The Arduino was used as an external power supply and 50 kΩ and 15 kΩ resistors were used in series to act as a potentiometer to bring the voltage down to 1.1 V. However, there was an issue regarding the current being too low. Batteries were also considered, but the multimeter was used to check the voltage of the batteries in the lab, and the batteries were higher than the max value the laser diode would allow. As a result, batteries were not used for testing. And the external power supply was instead used to power the laser diode.

The photodiode readout circuit was connected to the Arduino and recorded the voltage difference from the circuit with and without the presence of water, with an operating voltage and current of 1.2 V and 0.05 A, respectively. The condition was set such that when the value from the analog read dropped to a certain value, the output to a digital pin drove the alarm buzzer and LED.

Following these tests, the housing for the sensors was built and the Arduino code was calibrated to dictate when the alarm sounds and to set the voltage threshold (e.g., approximately 2 seconds after the photodiode has detected a low voltage reading).

Testing Fully Assembled Prototype

The alarm was assembled and setup to detect a fluid level at 18 mL. Consistent results were observed for clear, red-tinged, and yellow-tinged fluid. Additionally, tests were performed and consistent with varying degrees of opacity (obtained via the addition of non-dairy creamer).

Technical Details

Assembly Instructions

U-Shaped Housing

In various implementations, when touching the laser diode or photodiode, anti-static grounding straps should be used as a precautionary measure to not damage the components with static discharge.

Using a shielded cable with 4 conductors, a portion of the cable was stripped and the wires were used to connect to the laser and photodiode. The laser was placed on the right side of the housing (U-shaped housing facing downwards, looking at the outside of the curve), and the photodiode placed on the left side of the housing. Wires should first be threaded along the length of the housing so the components can be soldered from the openings of the housing. Test that the components fit in the holes inside of the housing before continuing with the soldering process A black wire was soldered to the laser's ground pin, and a green wire was soldered to the laser diode power pin. A white wire was soldered to the photodiode ground pin, and a red wire was soldered to the photodiode output pin.

Following soldering, the laser diode and photodiode should be secured inside of their respective holes in the housing. The housing end caps can now be super glued to the "U"—the end cap with the hole for the wire should be on the right side (U-shaped housing facing downwards, looking at the outside of the curve). The cable should be left long at this step so it can connect with the Adafruit 32u4 feather board.

Electronics

The three-part enclosure box or housing must first be 3D printed. Due to its large size, it can be created with a filament printer utilizing PLA. The bottom part is configured to hold the battery, the middle part is configured to hold the Adafruit 32u4 feather board, and the top part is configured to be used to cover the assembly and allow for speaker holes and a hole for the activation LED. The pre-attached 2-pin JST-PH connector of the 3.7 V LiPo battery extends through a hole in the middle part of the enclosure box and connects directly into the JST jack of the feather board. In order to be able to turn the device on and off, a black SPDT slide power switch may be connected and soldered to the ground and enable pins on the feather board.

In order for the device to alert the nursing staff with an activation LED and a buzzer alarm, the LED should be connected and soldered to the ground and the analog pin 11 of the feather board, and the buzzer alarm should be connected and soldered to the ground and the analog pin 3 of the feather board. Finally, in order to ensure that the diodes do not burn from a high current or voltage, a 51Ω resistor must be connected from the analog 0 pin to the photodiode and ground, while a 75Ω resistor must be connected from the 3.3 V pin of the feather board to the laser diode and ground. The topper case is then used to cover the whole assembly and allows for the buzzer alarm to be heard and the activation LED to be seen when over-drainage has occurred. A circuit schematic can be seen in FIG. 11.

Final Attachment to EVD

Following the 3D printing of the clamp piece and 2 rail end pieces, the parts may need some sizing modifications to ensure proper fit of pieces. To ensure that slots and holes are the right size, the holes for the rail should be filed on all 3 pieces. The parts should be able to easily slide along the metal rail. Furthermore, the hole on the clamp piece for a spring may need to be deepened with a drill with a 9/64 drill bit (or a size that is as close to 3.5 mm diameter as possible). The screw holes on the rail end pieces must be threaded the entire length using M3-0.5 sized taps, for example.

The device can now be assembled. First, slide an end piece onto the rail and ensure that the hole in the rail and the hole in the end piece are aligned. Insert a M3-0.5 (~20 mm length) screw into the hole of the end piece. If the threaded hole is loose, the screw can be tightened with a M3 nut on the back of the end piece. Next, insert the small spring into the hole on the printed clamp piece. Place the black hardened metal tab on top of the spring and ensure that the metal tab slides into the curved pocket on the back of the clamp. This assembly can now be moved onto the rail. Test whether gripping the tab will allow for the clamp to easily move up and down the rail. If not, then additional filing may be required or the positioning of the spring may need to be adjusted. Lastly, slide the last end piece onto the bottom of the rail and secure it in place with an M3 screw.

Following the assembly of the U-shaped housing with the laser and photodiode inside, the clamp piece can be attached to this housing. Using the guides on the edge of the housing and the clamp, the two pieces can slide into each other. Flip the housing so that the curve points downwards. Then, apply super glue (cyanoacrylate) to the guides on the right side (viewing the outside of the curve) of the housing and slide the two pieces together.

The rail end pieces and the box housing the electronics can be attached to the EVD either using double sided tape or Command Strips, which would allow for removal of the parts if the EVD needs to be disposed of. Utilize the overhangs on the end pieces to ensure that all parts are aligned after assembly.

Operation Instructions

Turning the Device on and Off

To turn on the drainage alarm apparatus, the black switch on the side of the electronics box needs to be moved to the up position. To test whether the device is operating correctly, a piece of cardboard can be placed between the photodiode and laser. The alarm should sound after 2 seconds of the laser being obstructed from the photodiode. After the device detects an over-drainage in the EVD, the alarm will continue to sound until shut off. To shut off the device, turn the switch back to the off position.

Adjusting the Position

To adjust the position of the housing, hold down the metal tab on the clamp. Grasp the handle attached to the clamp and move the housing up or down. When the metal tab is released, the device should be locked in place.

In the working prototype, due to the size of the housing, components placed on the outside did not allow it to move to the top of the liquid collection vessel on the EVD. In future versions where the laser and photodiode are properly secured on the inside of the housing, the dimensions should allow for the housing to move the entire length of the collection vessel.

Charging the Device

Plug the micro-LiPo charger via any USB C cable into a USB port and the 3.7 V lithium polymer (LiPo) rechargeable battery into the JST plug on the other end of the micro-LiPo charger. While the battery is charging, a red LED light will shine. When the battery is fully charged and ready to be used, the green LED will be lit.

Various components of the device may be 3D printed. Therefore, the measurements are approximations of the dimensions of the final printed product and assembly, in millimeters.

The invention claimed is:

1. An apparatus, comprising:
a U-shaped housing having a first end and a second end, wherein the first end and the second end of the U-shaped housing are configured to be arranged on opposing sides of a vessel;
a photodiode coupled to the first end of the U-shaped housing;
a laser diode coupled to the second end of the U-shaped housing, wherein the laser diode and the photodiode are arranged in the U-shaped housing facing each other such that a contact layer of the photodiode is configured to receive a laser beam emitted from the laser diode; and
an alert processor electrically coupled to the photodiode and to at least one alert generator, wherein the photodiode and the laser diode are arranged in a first plane in the U-shaped housing such that the first plane is configured to be parallel to fluid-level indicators on the vessel, wherein a mid-portion of the U-shaped housing extending between the photodiode and the laser diode is arranged at a displacement angle relative to the first plane, and wherein the displacement angle of the mid-portion of the U-shaped housing ranges from 30 to 60 degrees upward or downward relative to the first plane to provide visibility of the fluid-level indicators on the vessel at a target location between the photodiode and the laser diode.

2. The apparatus of claim 1, wherein the photodiode is configured to output current in response to the laser beam of the laser diode, and wherein the alert processor is configured to cause at least one alert when the current output from the photodiode is determined to drop to a predetermined threshold.

3. The apparatus of claim 2, wherein the predetermined threshold of the current output is 0 Amps.

4. The apparatus of claim 2, wherein the at least one alert is in the form of visible or audible feedback.

5. The apparatus of claim 1, wherein in the at least one alert generator is a light, an electronic display, an alarm, and a vibration controller.

6. The apparatus of claim 1, further comprising:
a power source coupled to the photodiode, the laser diode, and the alert processor.

7. The apparatus of claim 1, further comprising:
a carrier coupled to either the first end or the second end of the U-shaped housing, wherein the carrier has a coupling in the form of an adhesive, reciprocal hook and loop, or a magnet that is configured to removably mount the carrier to a support for the vessel.

8. A method, for using the apparatus of claim 1, the method comprising:
arranging the first end and the second end of the U-shaped housing on opposing sides of a vessel at a target fluid level;
activating the photodiode and the laser diode such that the laser diode directs a laser beam to the contact layer of the photodiode;
continuously receiving, via the alert processor, a current output from the photodiode;
receiving a fluid in the vessel and thereby causing a fluid level in the vessel to rise; and
disrupting a path of the laser beam, via the fluid, when the fluid level rises to the target fluid level, and thereby causing the current output of the photodiode to drop;
determining, via the alert processor, that the current output has dropped to a predetermined threshold; and
in response to determining that the current output has dropped to the predetermined threshold, sending a signal, via the alert processor, to the at least one alert generator and thereby causing at least one alert to be generated.

9. The method of claim 8, further comprising:
wherein sending the signal, via the alert processor, to the at least one alert generator comprises sending a wireless signal to at least one remote computing device.

10. The method of claim 8, further comprising:
generating the at least one alert in the form of visible or audible feedback.

11. The method of claim 10, wherein generating the at least one alert in the form of the visible or audible feedback comprises activating a first alert generator in the form of an LED and second alert generator in the form of an alarm.

12. The method of claim 10, wherein generating the at least one alert in the form of the visible or audible feedback comprises activating the at least one alert generator on at least one remote computing device in the form an electronic display, an alarm, and a vibration controller.

13. The method of claim 8, wherein the fluid is opaque or translucent.

14. The method of claim 8, wherein the predetermined threshold of the current is 0 Amps.

15. The method of claim 8, wherein the target fluid level corresponds to a fluid level ranging from 18 mL to 20 mL to detect over-drainage.

16. The method of claim 8, wherein the target fluid level corresponds to a fluid level ranging from 30 mL to 40 mL to detect severe over-drainage.

17. An apparatus, comprising:
a U-shaped housing having a first end and a second end, wherein the first end and the second end of the U-shaped housing are configured to be arranged on opposing sides of a vessel;
a photodiode coupled to the first end of the U-shaped housing;
a laser diode coupled to the second end of the U-shaped housing, wherein the laser diode and the photodiode are arranged in the U-shaped housing facing each other such that a contact layer of the photodiode is configured to receive a laser beam emitted from the laser diode;
an alert processor electrically coupled to the photodiode and to at least one alert generator;
a rail configured to be coupled to a support for the vessel such that the rail is arranged adjacent to and parallel to a length of the vessel; and
a carrier having a through-hole to receive the rail therethrough, wherein the carrier is coupled to either the first end or the second end of the U-shaped housing, wherein the carrier is slidably coupled to the rail, wherein the carrier has a clamp configured to lock the U-shaped housing in place when the U-shaped housing is moved along the rail to a target location relative to the vessel.

18. The apparatus of claim 17, wherein the photodiode and the laser diode are arranged in a first plane in the U-shaped housing such that the first plane is configured to be parallel to fluid-level indicators on the vessel.

19. The apparatus of claim 18, wherein a mid-portion of the U-shaped housing extending between the photodiode and the laser diode is arranged at a displacement angle relative to the first plane.

20. The apparatus of claim 19, wherein the displacement angle of the mid-portion of the U-shaped housing ranges from 30 to 60 degrees upward or downward relative to the first plane to provide visibility of the fluid-level indicators on the vessel at a target location between the photodiode and the laser diode.

* * * * *